United States Patent
Hsu (10) Patent No.: US 7,455,278 B2
(45) Date of Patent: Nov. 25, 2008

(54) MOTOR FRAME

(76) Inventor: Huang-Hsi Hsu, 8F., No. 14, Lane 252, Chungshan N. Rd., Sec. 6, Taipei (TW)

( * ) Notice: Subject to any disclaimer, the term of this patent is extended or adjusted under 35 U.S.C. 154(b) by 0 days.

(21) Appl. No.: 11/705,539

(22) Filed: Feb. 13, 2007

(65) Prior Publication Data

US 2008/0191108 A1   Aug. 14, 2008

(51) Int. Cl.
  *F16M 3/00* (2006.01)
(52) U.S. Cl. ............................. 248/675; 248/300
(58) Field of Classification Search .............. 248/674, 248/675, 201, 300, 649; 403/252, 263, 308
See application file for complete search history.

(56) References Cited

U.S. PATENT DOCUMENTS 3,509,391 A * 4/1970 Pfeuffer .................... 310/17
3,983,429 A * 9/1976 Allardice, Jr. .............. 310/91
4,666,122 A * 5/1987 Goodard .................... 248/666
7,021,599 B2 * 4/2006 DeGrazia et al. ........... 248/645

* cited by examiner

*Primary Examiner*—Ramon O Ramirez
(74) *Attorney, Agent, or Firm*—Bacon & Thomas, PLLC (57) ABSTRACT

The present invention discloses a motor frame that includes a first plate and a second plate, and the first plate has a plurality of locking holes at an end of the first plate, and an end of the second plate has a spacer movably protruded from both lateral sides of the second plate, and another end of the second plate is movably connected to another end of the first plate by at least one connecting element, such that an end of the first plate can be connected to an external side of a barbeque stove by the locking holes, and an end of the second plate can be used for mounting a motor mount and fixing the motor mount onto the barbeque stove.

11 Claims, 8 Drawing Sheets

MOTOR FRAME

FIELD OF THE INVENTION

The present invention relates to a motor frame, and more particularly to a motor frame having a motor mount with a changeable shape for installing motor frames of different specifications.

BACKGROUND OF THE INVENTION

As our life improves, we pay more attentions on personal taste and style of leisure activities, and a barbeque suitable for the gathering of a whole family and good friends becomes increasingly popular. However, general barbeque stoves and accessories available in the market come with a very simple design, but they are not easy to use. When we compare two barbeque stoves having a reasonable price, user-friendliness and practicability are the key factors for consumers to decide their purchase. Since the market competition among various different barbeque stoves is severe, major manufacturers and designers in the related industry spare no effort to develop practical and user-friendly products, or else they will be kicked out from the market.

Figure 1:
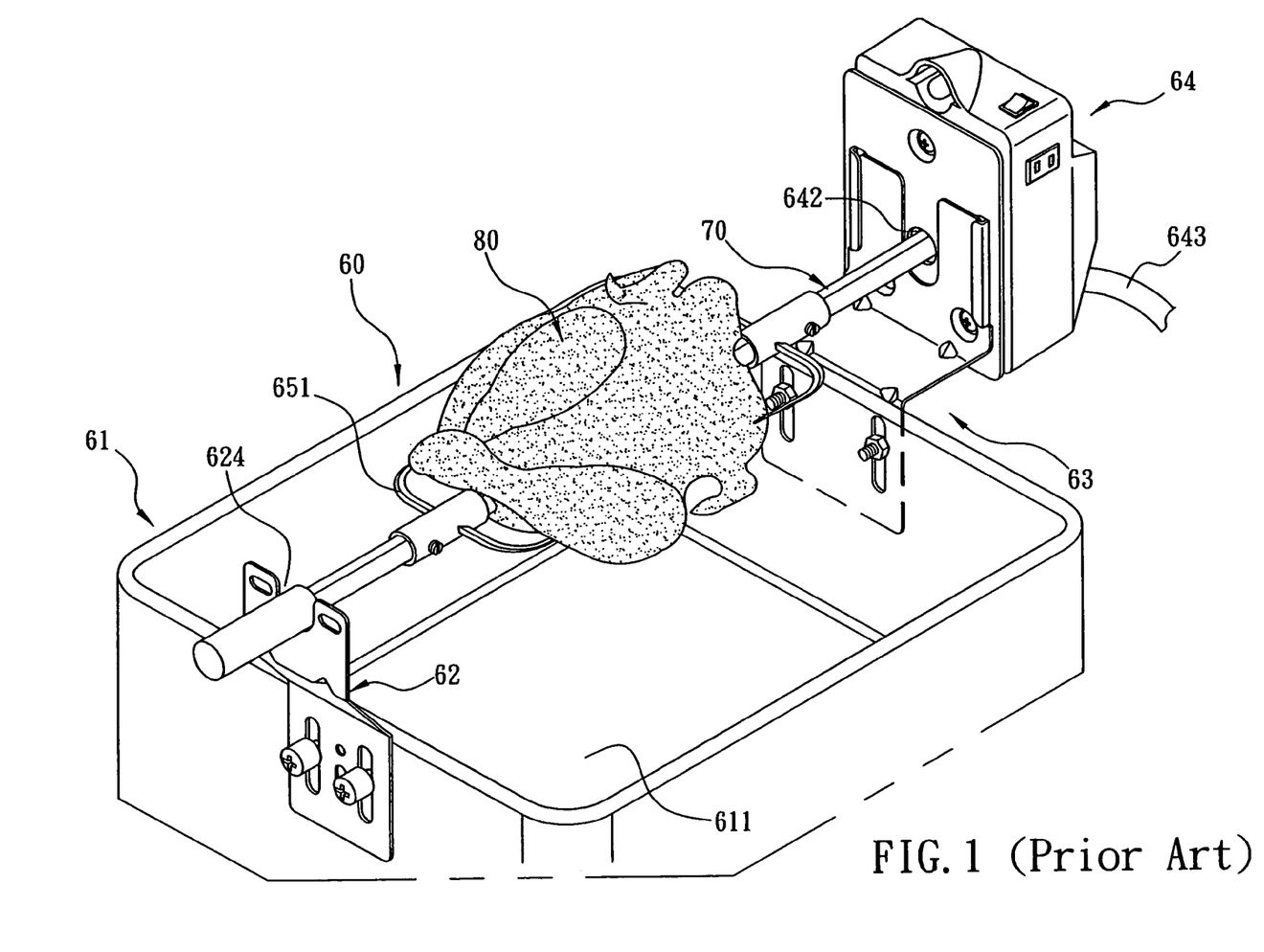
FIG. 1 is a schematic view of a structure of a conventional rotisserie.

Referring to FIG. 1 for a traditional rotisserie 60, the rotisserie 60 includes a hollow grill rack 61 with a U-shaped cross section, and the grill rack 61 has a containing space 611 for containing the related barbeque tools and accessories including a stove, a grill, and charcoals (not shown in the figure), and both opposite sidewalls of the grill rack 61 have a fixing stand 62 and a motor fixing stand 63 respectively, and a motor mount 64 is embedded precisely in the motor fixing stand 63, and a lateral side of the motor mount 64 has an axle hole 642 for inserting a rod 70, and another end of the rod 70 is disposed on a first slot 624 of the fixing stand 62, and has a pair of spits 651 disposed at appropriate positions, so that a desired barbeque item 80 can be skewered on the rod 70 and the spit 651 and revolved over a charcoal flame in the grill rack 61 by the rotation of the rod 70 driven by the motor mount for cooking or roasting the desired barbeque item 80.

Figure 2:
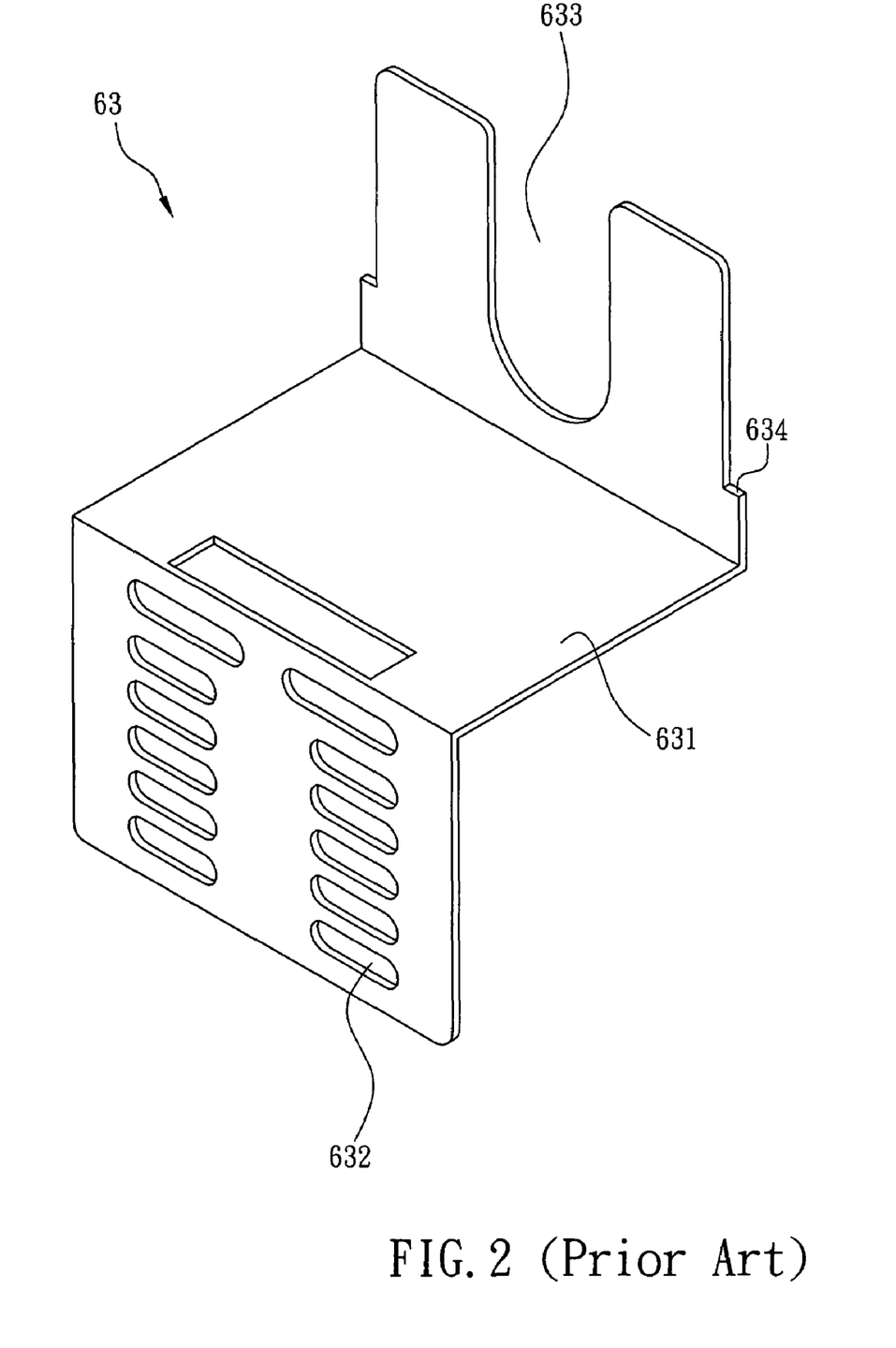
FIG. 2 is a schematic view of a conventional Z-shaped motor frame.

In FIGS. 1 and 2, the motor fixing stand 63 is preferably a Z-shaped board 631, and an end of the board 631 has a plurality of locking holes 632, such that the board 631 can be fixed onto the external sides of the hollow grill rack 61 by the locking holes 632, and the motor mount 64 can be placed at an end of the board 631 far away from the hollow grill rack 61, and the rod 70 can be passed through a second slot 633 and the first slot 624 of the fixing stand 62 for barbeque cooking. To comply with another type of motor mount (not shown in the figure), a stop edge 634 is built at an end of the motor fixing stand 63 having the second slot 633 and corresponding to both lateral sides of the second slot 633, such that when the motor mount is placed at an end of the board 631 away from the stop edge 634, the motor mount can be pressed on the stop edge 634 for barbeque cooking.

Figure 3:
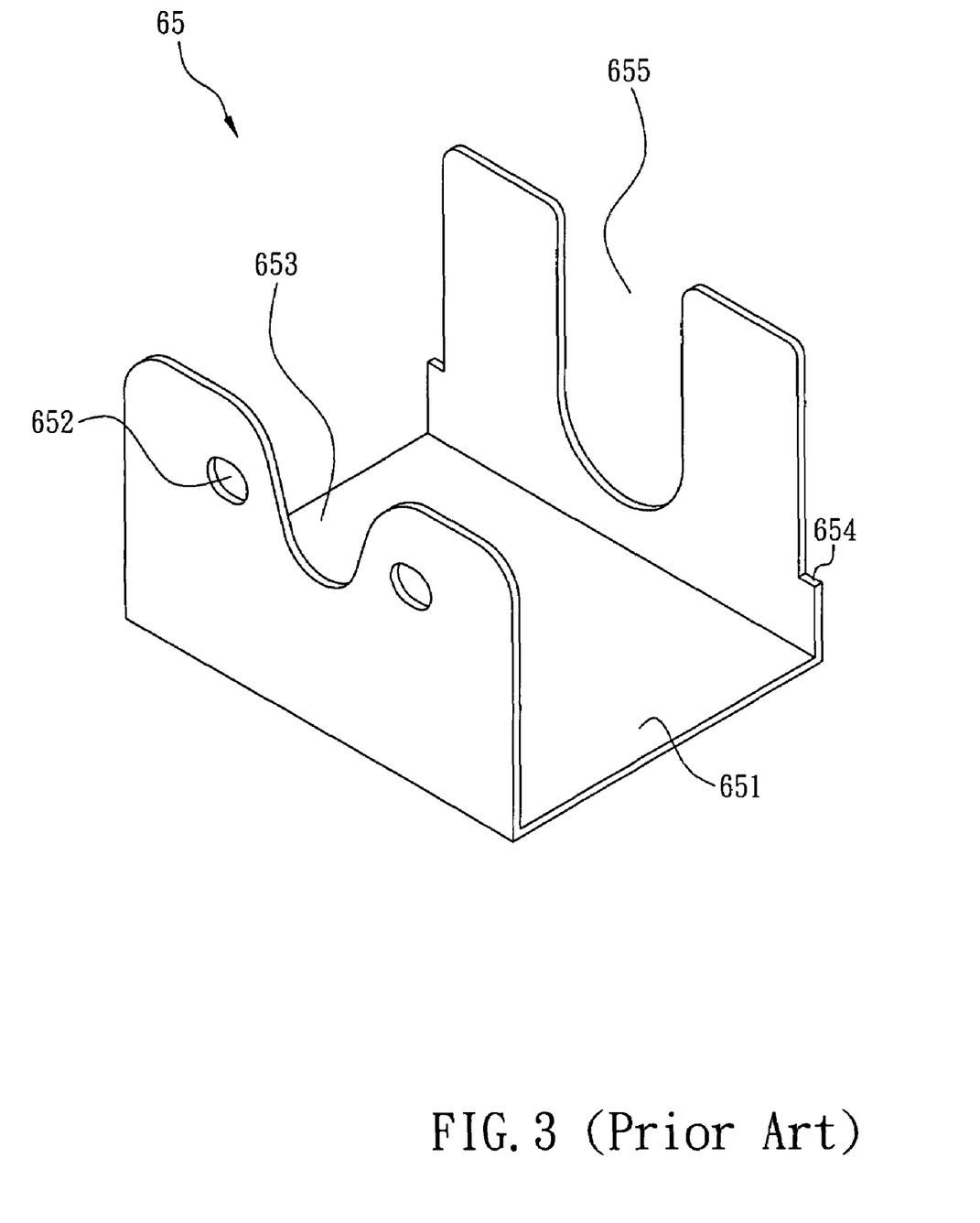
FIG. 3 is a schematic view of a conventional U-shaped motor frame.

To comply with another type of motor mount (not shown in the figure) as shown in FIGS. 1 and 3, the motor fixing stand 65 is primarily comprised of a U-shaped board 651, a third slot 653 and a fourth slot 655, both disposed on both ends of the board 651 respectively, wherein the board 651 includes a plurality of locking holes 652 disposed at an end having the third slot 653, and the board 651 can be locked onto a lateral side of the grill rack 61 by the locking holes 652, and an end of the board 651 having the fourth slot 655 is provided for installing a motor mount (not shown in the figure), so that the motor mount can be placed at an end of the board 651 far from the grill rack 61, and a rod 70 of the motor mount can be passed through the third and fourth slots 653, 655 for barbeque cooking. To comply with a further type of motor mount (not shown in the figure), another stop edge 654 is built at an end of the motor fixing stand 65 having the fourth slot 655 and far from two corresponding lateral sides having the fourth slot 655, such that when the motor mount is placed at an end of the board 651 away from the other stop edge 654, the motor mount can be pressed on the other stop edge 654 for barbeque cooking.

Since the foregoing conventional motor mount has to work with different motor fixing stands 63, 65, such that related manufacturers have to prepare various different motor fixing stands to provide a fully equipped barbeque stove for users. However, users only use one motor fixing stand at a time, and the rest of the motor fixing stands become an excess or a waste. Furthermore, these motor fixing stands come with an integrally formed design, and thus it takes more space for users to store the motor frame, and becomes an important issue for related designers and manufacturers.

SUMMARY OF THE INVENTION

In view of the foregoing shortcoming of the conventional motor frame, the inventor of the present invention based on years of experience in the related industry to conduct extensive researches and experiments, and finally developed a motor frame that uses simple components for its connection and substitutes the conventional motor frame that goes with a motor of a certain specification. The motor frame of the invention is characterized in that the motor frame comprises a first plate and a second plate, both being L-shaped, and the first plate has a plurality of locking holes disposed at an end of the first plate, and the second plate has a spacer disposed at an end of the second plate and movably protruded from each of both lateral sides of the second plate, and another end of the second plate is movably connected to another end of the first plate by at least one connecting element, such that an end of the first plate can be connected to an external side of a barbeque stove by the locking holes, and an end of the second plate can be used for mounting a motor mount for fixing the motor mount onto the barbeque stove.

A primary objective of the present invention is to provide a motor frame, such that when the first plate and the second plate are connected, an end of the first plate and an end of the second plate may be aligned in the same direction or in opposite directions to form a motor frame of a different shape (either U-shaped or Z-shaped) for installing motor mounts of different specifications.

Another objective of the present invention is to provide a motor frame, such that when the first plate and the second plate are connected, an end of the first plate may or may not add a spacer to form a motor frame of different shapes for installing motor mounts of different specification.

A further objective of the present invention is to provide a sectional motor frame, such that users can save space for storing the motor frame.

To make it easier for our examiner to understand the objective, technical characteristics and effects of the present invention, a preferred embodiment will be described with accompanying drawings as follows:

DETAILED DESCRIPTION OF THE PREFERRED EMBODIMENTS

Figure 4:
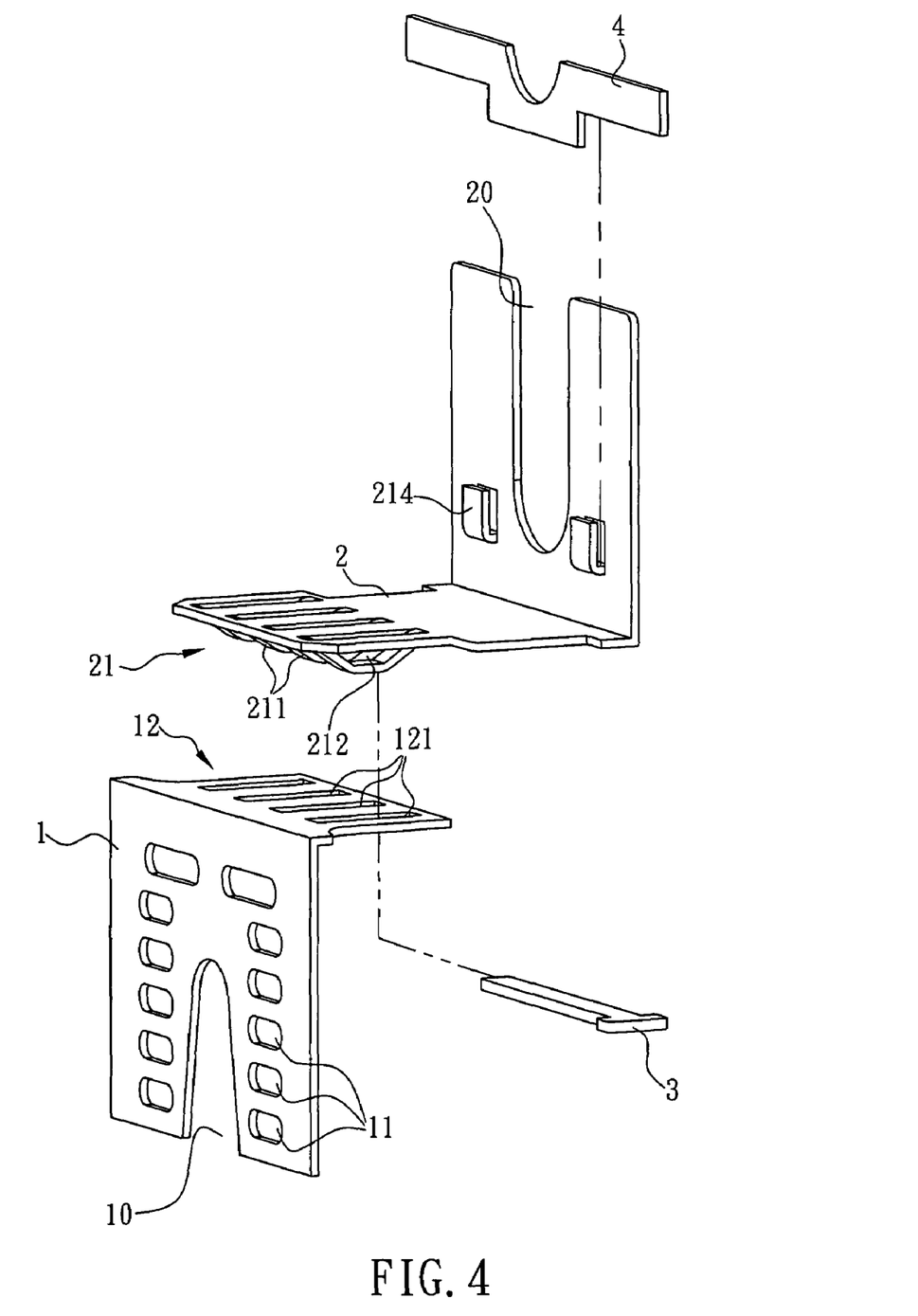
FIG. 4 is an exploded view of a Z-shaped motor frame of the present invention.

Referring to FIG. 4, a motor frame of the invention comprises a first plate 1 and a second plate 2, and both are L-shaped, and an end of the first plate 1 has a first slot 10 and a plurality of locking holes 11, and each locking hole 11 is disposed separately on both lateral sides at an end of the first plate 1 and parallel to the first slot 10, and another end of the first plate 1 has a first connecting portion 12, and an end of the second plate 2 has a second slot 20, and another end of the second plate 2 has a second connecting portion 21, such that if another end of the first plate 1 is superimposed on another end of the second plate 2, the second connecting portion 21 is movably connected to the first connecting portion 12 by at least one connecting element 3, and the second plate 2 has a spacer 4 disposed at an end having the second slot 20 and movably installed onto or removed from a surface of the second connecting portion 21. If the spacer 4 is installed on a surface of the second plate 2, both ends of the spacer 4 are protruded from the lateral sides, and thus an end of the first plate 1 is connected to an external side of a barbeque stove by the locking holes 11, and an end of the second plate 2 is provided for installing a motor mount (not shown in the figure) to fix the motor mount on the barbeque stove. If it is necessary to connect the second connecting portion 21 and the first connecting portion 12 of the motor frame, an end of the first plate 1 and an end of the second plate 2 may be aligned either in the same direction or in opposite directions, and a spacer 4 can be installed at an end of the first plate 1 to change the shape of the motor frame (such as U-shaped or Z-shaped) for installing a motor mount of a different specification.

Referring to FIG. 4 for a first preferred embodiment of the present invention, the second connecting portion 21 is comprised of a plurality of protrusions 211 disposed equidistantly at another end of the second plate 2, and each protrusion 211 is protruded out of the lateral sides of the second plate 2 on the opposite side of the second slot 20a, and has an opening 212, such that the openings 212 face each other. The first connecting portion 12 has an open slot 121 disposed on an edge at another end of the first plate 1 and matching with each protrusion 211 for movably extending each protrusion 211 into a corresponding open slot 121, and each protrusion 211 and its opening 212 are protruded from the first plate 1 that faces a lateral side of the first slot 10, and the connecting element 3 is an insert pin. If a lateral side at another end of the first plate 1 is stacked with a lateral side at another end of the second plate 2, each protrusion 211 is movably extended into the corresponding open slot 121, and each protrusion 211 and its opening 212 are protruded from another side of the first plate 1, such that the insert pin can be passed sequentially through each opening 212 and fixed at the connection of the first connecting portion 12 and the second connecting portion 21, such that the first plate 1 and the second plate 2 can be fixed with each other and will not be separated from each other easily.

Figure 5:
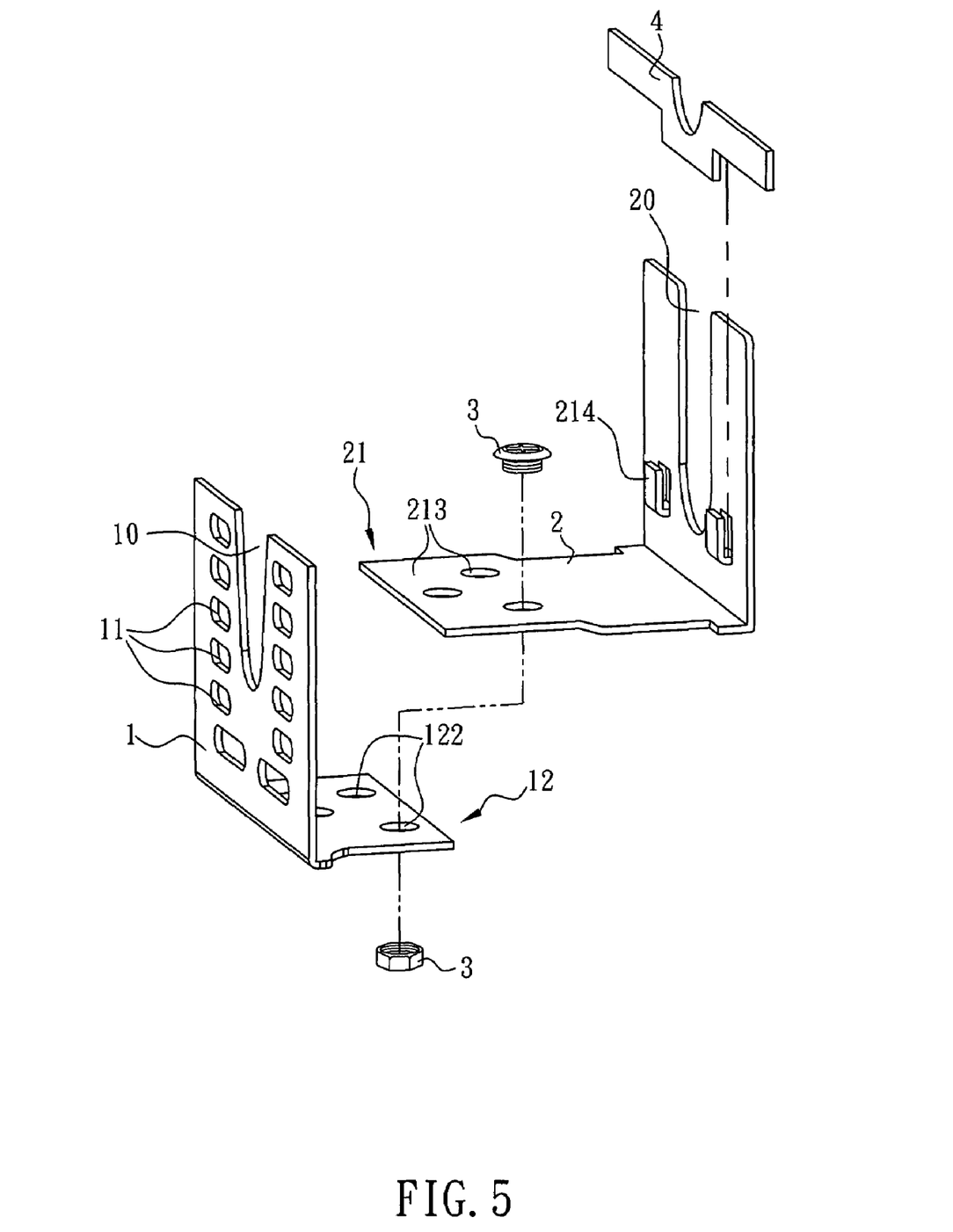
FIG. 5 is an exploded view of a motor frame using different connecting elements in accordance with the present invention.

Referring to FIG. 5 for a second preferred embodiment of the present invention, the first connecting portion 12 can be comprised of a plurality of first through holes 122 disposed at another end of the first plate 1, and the second connecting portion 21 is a second through hole 213 disposed at another end of the second plate 2 and corresponding to the first through hole 122. The connecting element 3 can be a plurality of screw bolts, such that if another end of the first plate 1 is superimposed onto another end of the second plate 2, and each first through hole 122 is connected with each second through hole 213, each screw bolt is passed through the corresponding first through hole 122 and second through hole 213, then the first plate 1 and the second plate 2 can be fixed with each other and will not separated from each other easily.

Figure 6:
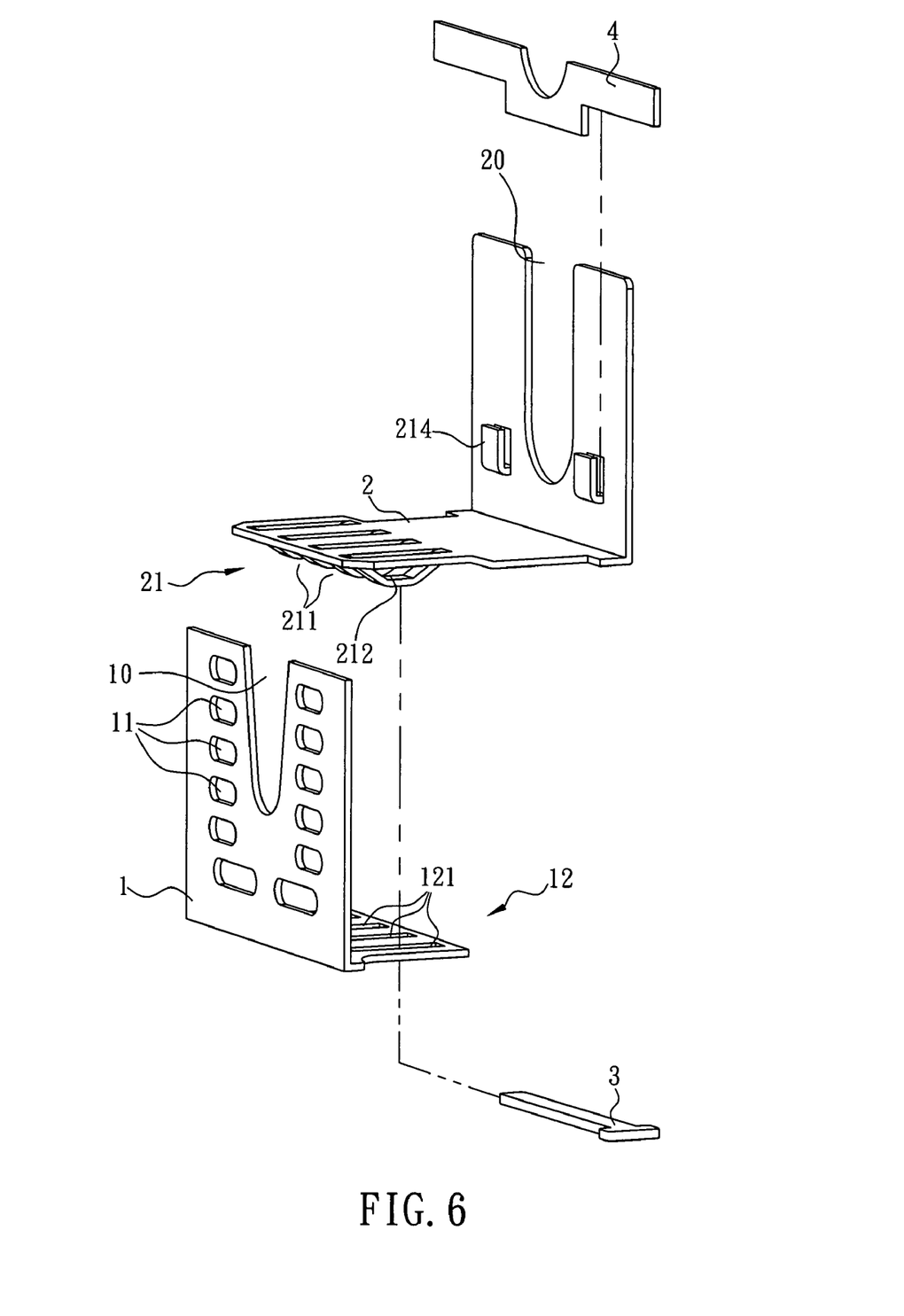
FIG. 6 is an exploded view of a U-shaped motor frame of the present invention.

Referring to FIGS. 5 and 6 for a third preferred embodiment of the present invention, a retainer bracket 214 is installed horizontally at an end of the second plate 2 and corresponding to both lateral sides of the second slot 20, and each retainer bracket 214 is provided for fixing the spacer 4 onto a surface at an end of the second plate 2, such that both ends of the spacer 4 are protruded out of the first board. When the motor mount is mounted to an end of the second plate 2, the motor mount can be pressed by both ends of the spacer 4 to maintain a specific height.

Figure 7:
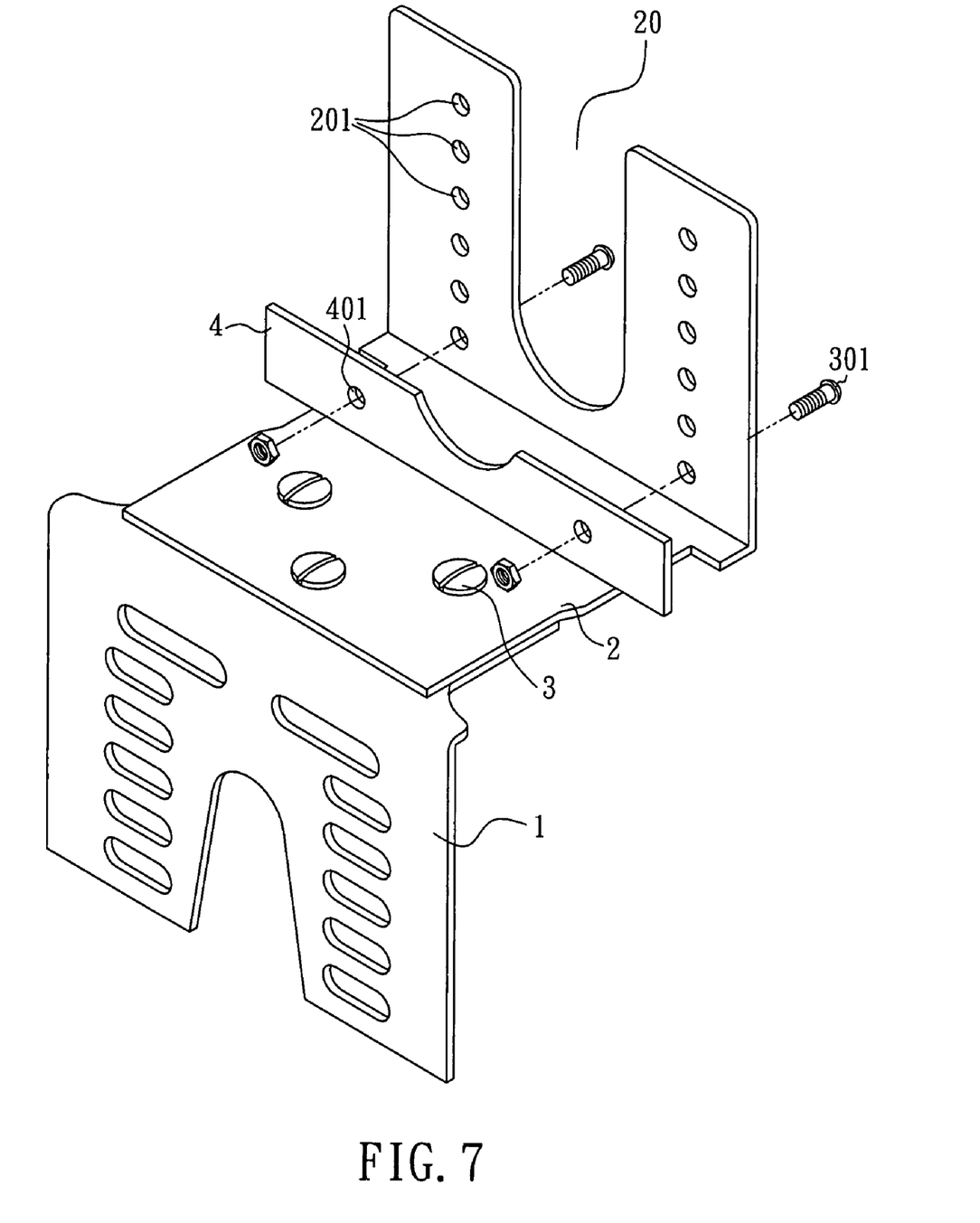
FIG. 7 is a schematic view of connecting a Z-shaped motor frame and a spacer in accordance with the present invention.

To movably latch the spacer 4 onto the second plate 2 as illustrated in a fourth preferred embodiment of the present invention and shown in FIG. 7, the second plate 2 has a plurality of first opening holes 201 disposed at an end having the second slot 20 and corresponding to both lateral sides of the second slot 20, and the first opening holes 201 are disposed equidistantly on the second plate 2, and both ends of the spacer 4 respectively have a second opening hole 401 corresponding to any two horizontal first opening holes 201, and each second opening hole 401 matches with each first opening hole 201. If it is necessary to fix the spacer 4 at the second plate 2 horizontally, a screw bolt 301 is passed sequentially through the first and second opening holes 201, 401 and then the spacer 4 is locked onto the second plate 2 horizontally, such that a user can adjust the height of the second plate 2 to fit a motor mount of a different specification.

Figure 8:
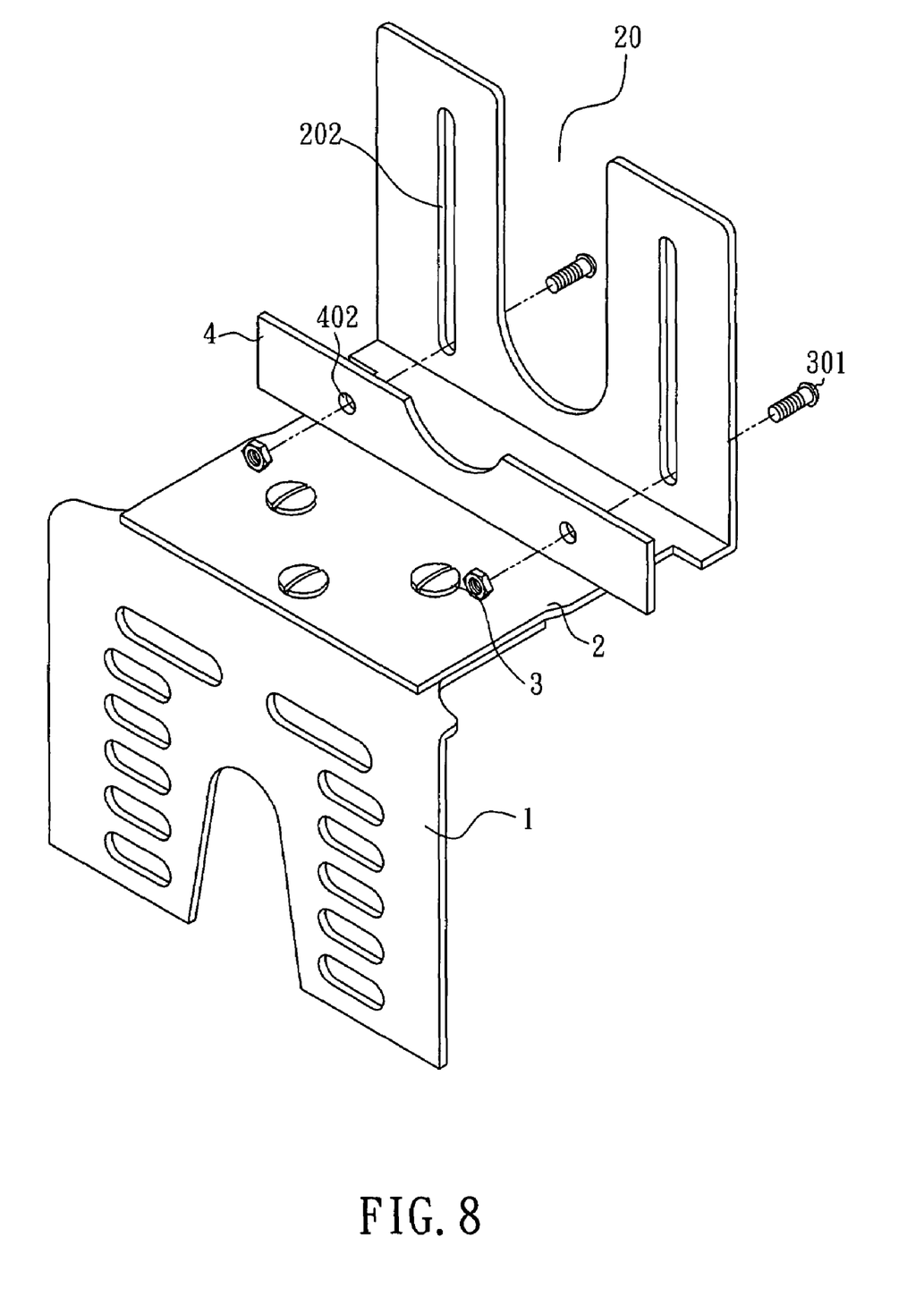
FIG. 8 is another schematic view of connecting a Z-shaped motor frame and a spacer in accordance with the present invention.

In the fourth preferred embodiment, the first opening holes 201 are disposed equidistantly with each other to provide several options of adjusting the height of the spacer 4 that is fixed onto the second plate 2. However, the spacer 4 cannot be installed precisely to the motor mount, if the height of a motor mount according to its specification falls between any two first opening holes 201. Referring to FIG. 8 for a fifth preferred embodiment of the present invention, the second plate 2 has a slender open slot 202 disposed at an end having the second slot 20 and parallel with two corresponding lateral sides of the second slot 20, and both ends of the spacer 4 have a third opening hole 402 disposed parallel and corresponding to each slender open slot 202. The spacer 4 can be shifted at an end of the second plate 2 by passing a screw bolt 301 through the slender open slot 202 and each third opening hole 402. Until the motor mount of a specific specification complies with the height of the spacer 4, the spacer 4 can be latched onto the second plate 2 horizontally.

In FIG. 4, the motor mount is applied to a Z-shaped motor frame, and an end of the first plate 1 and an end of the second plate 2 are aligned in different directions, and another end of the first plate 1 and another end of the second plate 2 are superimposed with each other, and the second connecting portion 21 and the first connecting portion 12 are connected with each other by the connecting element 3 and will not be separated from each other easily, so that a user can fix an end of the first plate 1 with an external side of the barbeque stove by the locking holes 11. The motor mount is installed at an end of the second plate 2, so that the motor mount can be fixed onto the barbeque stove, and a protruding axle of the motor mount can be passed through the first slot 10.

If the motor mount is applied to a Z-shape motor frame and fixed to a motor frame at a specific height, then an end of the first plate 1 and an end of the second plate 2 are aligned in different directions, and another end of the first plate 1 and another end of the second plate 2 are superimposed with each other, and the second connecting portion 21 is connected to the first connecting portion 12 by a connecting element 3, and the spacer 4 is latched onto a surface at an end of the second plate 2 horizontally, such that both ends of the spacer 4 are protruded out of the first plate 1. If the motor mount is installed at an end of the second plate 2, the motor mount can be pressed by both ends of the spacer 4 to maintain a specific height.

If the motor mount is applied for a U-shaped motor frame as shown in FIGS. 5 and 6, an end of the first plate 1 and an end of the second plate 2 are aligned in the same direction, and another end of the first plate 1 and another end of the second plate 2 are stacked with each other, and the second connecting portion 21 and the first connecting portion 12 are connected with each other by the connecting element 3 and cannot be separated easily. Users can connect an end of the first plate 1 with an external side of the barbeque stove by the locking holes 11, and the motor mount is installed at an end of the second plate 2, such that the motor mount can be fixed onto the barbeque stove, and a protruding axle of the motor mount can be passed sequentially through the first and second slots 10, 20.

If the motor mount is applied in a U-shaped motor frame, and the motor frame is fixed at a specific height, then an end of the first plate 1 and an end of the second plate 2 are aligned in the same direction, and another end of the first plate 1 and another end of the second plate 2 are superimposed with each other, and the second connecting portion 21 is connected to the first connecting portion 12 by the connecting element 3, and then the spacer 4 is latched onto a surface at an end of the second plate 2 horizontally, such that both ends of the spacer 4 are protruded out of the first board. When the motor mount is installed at an end of the second plate 2, the motor mount can be pressed by both ends of the spacer 4 to maintain a specific height.

It is noteworthy to point out that the present invention can be installed, removed and reinstalled according to different specifications, and thus it can save lots of material cost for preparing a motor frame to fit motor mounts of different specifications. In addition, the disassembled motor frame can be stored easily. Therefore, the present invention complies with the patent application requirements and is duly filed for patent application.

What is claimed is:

1. A motor frame, comprising:
    a first plate, substantially being L-shaped, and having a first slot and a plurality of locking holes disposed at an end of said first plate, and a first connecting portion disposed at another end of said first plate; and
    a second plate, substantially being L-shaped, and having a second slot disposed at an end of said second plate, and a second connecting portion disposed at another end of said second plate and movably connected with said first connecting portion by at least one connecting element; wherein said first connecting portion is comprised of a plurality of open slots disposed equidistantly with each other and on said first plate; said second connecting portion is comprised of a plurality of protrusions corresponding to said open slots correspondingly, and said each protrusion is protruded from an end of said second plate and on the opposite side of said second slot, and said each protrusion has an opening, so that said openings face each other, and said each protrusion and said opening are extended into said corresponding open slots and protruded from a side of said first plate facing said first slot; and said connecting element is an insert pin extended into said each opening sequentially and fixed at a connection of said first connecting portion and said second connecting portion.

2. The motor frame of claim 1, wherein said first connecting portion is comprised of a plurality of first through holes; said second connecting portion is comprised of a second through hole corresponding to said first through hole; and said connecting element is comprised of a plurality of screw bolts passed through said first through hole and said second through hole and fixed at a connection of said first connecting portion and said second connecting portion.

3. The motor frame of claim 1, wherein said second plate includes a spacer movably mounted at an end having said second slot and disposed on a surface facing said second connecting portion, and both ends of said spacer are protruded out of both lateral sides of said second plate.

4. The motor frame of claim 3, wherein said second plate includes a retainer bracket disposed horizontally on each of two corresponding lateral sides at an end of said second slot, and said each retainer bracket is provided for mounting said spacer horizontally.

5. The motor frame of claim 3, wherein said second plate includes a plurality of first opening holes disposed equidistantly from each other and at an end having said second slot and corresponding to both lateral sides of said second slot; and said spacer includes a second opening hole disposed respectively on both ends of said spacer and corresponding to the positions of any two first opening holes, and said second opening holes match with said first opening holes, and said spacer is mounted horizontally onto said second plate by passing a screw bolt through said first and second opening holes.

6. The motor frame of claim 3, wherein said second plate includes a slender open slot disposed at an end having said second slot, and parallel to two corresponding lateral sides of said second slot; and said spacer includes a third opening hole disposed horizontally at both ends corresponding to said each slender open slot, and said spacer can be mounted onto said second plate or movably shifted at an end of said second plate by passing a screw bolt through said each slender open slot and said each third opening hole.

7. The motor frame of claim 2, wherein said second plate includes a spacer movably mounted at an end having said second slot and disposed on a surface facing said second connecting portion, and both ends of said spacer are protruded out of both lateral sides of said second plate.

8. The motor frame of claim 4, wherein said second plate includes a retainer bracket disposed horizontally on each of two corresponding lateral sides at an end of said second slot, and said each retainer bracket is provided for mounting said spacer horizontally.

9. The motor frame of claim 7, wherein said second plate includes a plurality of first opening holes disposed equidistantly from each other and at an end having said second slot and corresponding to both lateral sides of said second slot; and said spacer includes a second opening hole disposed respectively on both ends of said spacer and corresponding to the positions of any two first opening holes, and said second opening holes match with said first opening holes, and said spacer is mounted horizontally onto said second plate by passing a screw bolt through said first and second opening holes.

10. The motor frame of claim 7, wherein said second plate includes a slender open slot disposed at an end having said second slot, and parallel to two corresponding lateral sides of said second slot; and said spacer includes a third opening hole disposed horizontally at both ends corresponding to said each slender open slot, and said spacer can be mounted onto said second plate or movably shifted at an end of said second plate by passing a screw bolt through said each slender open slot and said each third opening hole.

11. A motor frame, comprising:
   a first plate, substantially being L-shaped, and having a first slot and a plurality of locking holes disposed at an end of said first plate, and a first connecting portion disposed at another end of said first plate; and
   a second plate, substantially being L-shaped, and having a second slot disposed at an end of said second plate, and a second connecting portion disposed at another end of said second plate and movably connected with said first connecting portion by at least one connecting element;
   wherein said first connecting portion is comprised of a plurality of first through holes; said second connecting portion is comprised of a second through hole corresponding to said first through hole; and said connecting element is comprised of a plurality of screw bolts passed through said first through hole and said second through holes and fixed at a connection of said first connecting portion and said second connecting portion; and
   wherein said second plate includes a spacer movably mounted at an end having said second slot and disposed on a surface facing said second connecting portion, and both ends of said spacer are protruded out of both lateral sides of said second plate.

* * * * *